United States Patent
Najman

(10) Patent No.: US 9,006,505 B2
(45) Date of Patent: Apr. 14, 2015

(54) METHOD AND DEVICE FOR PROCESSING PLASTIC WASTE, ESPECIALLY POLYOLEFINS

(75) Inventor: Wojciech Najman, Skarzysko-Kamienna (PL)

(73) Assignee: Przedsiebiorstwo EKONAKS Sp. z o. o., Skarzysko-Kamienna (PL)

( * ) Notice: Subject to any disclaimer, the term of this patent is extended or adjusted under 35 U.S.C. 154(b) by 803 days.

(21) Appl. No.: 13/138,830

(22) PCT Filed: Apr. 9, 2009

(86) PCT No.: PCT/PL2009/050004
§ 371 (c)(1),
(2), (4) Date: Oct. 5, 2011

(87) PCT Pub. No.: WO2010/117284
PCT Pub. Date: Oct. 14, 2010

(65) Prior Publication Data
US 2012/0018677 A1 Jan. 26, 2012

(51) Int. Cl.
*C07C 1/00* (2006.01)
*B01J 19/20* (2006.01)
*C10G 1/08* (2006.01)
(Continued)

(52) U.S. Cl.
CPC . *B01J 19/20* (2013.01); *C10G 1/08* (2013.01); *C10B 47/24* (2013.01); *C10G 3/42* (2013.01); *C10G 2300/1088* (2013.01); *B01J 19/006* (2013.01); *B01J 19/28* (2013.01); *B01J 2219/0002* (2013.01); *B01J 2219/00033* (2013.01); *B01J 2219/00036* (2013.01); *B01J 2219/0009* (2013.01); *B01J 2219/00155* (2013.01); *B01J 2219/00157* (2013.01); *B01J 2219/00159* (2013.01); *B01J 2219/00182* (2013.01); *B01J 2219/00765* (2013.01); *B01J 2219/00768* (2013.01); *B01J 2219/00772* (2013.01); *B01J 2219/00777* (2013.01); *C10G 2300/1003* (2013.01)

(58) Field of Classification Search
CPC .... C10G 1/08; C10G 3/42; C10G 2300/1088; C10B 47/06; C10B 47/24; C10B 49/10; C10L 5/406; C10L 2290/02; B01J 19/00; B01J 19/006
USPC .............................. 585/241; 422/130; 201/25
See application file for complete search history.

(56) References Cited

U.S. PATENT DOCUMENTS 4,108,730 A * 8/1978 Chen et al. ...................... 201/2.5
4,175,211 A * 11/1979 Chen et al. ..................... 585/241
(Continued)

FOREIGN PATENT DOCUMENTS

PL 352341 A1 8/2003
PL 358774 A1 8/2004
(Continued)

*Primary Examiner* — Nina Bhat
(74) *Attorney, Agent, or Firm* — Andrew Malarz

(57) ABSTRACT

A method for processing plastic waste, in particular polyolefins, and a device for processing plastic waste, in particular polyolefins, are used especially in the industrial utilization of plastic waste. The method consists in that a primarily refined charge after being fed into a reactor (6) is fluidized and cracked during forced progressive-rotational movement coinciding with heating. A gas-steam fraction obtained during a utilization process is continuously guided out to a cooling system whereas impurities are periodically guided out from the reactor (6) to a waste tank (22).

14 Claims, 2 Drawing Sheets

(51) Int. Cl.
*C10B 47/24* (2006.01)
*C10G 3/00* (2006.01)
*B01J 19/00* (2006.01)
*B01J 19/28* (2006.01)

(56) References Cited

U.S. PATENT DOCUMENTS

| | | | |
|---|---|---|---|
| 4,235,676 A | 11/1980 | Chambers | |
| 4,822,573 A * | 4/1989 | Timmann | 422/143 |
| 5,190,226 A | 3/1993 | Holloway | |
| 5,288,934 A * | 2/1994 | de Broqueville | 585/241 |
| 5,427,650 A | 6/1995 | Holloway | |
| 5,500,120 A | 3/1996 | Baker | |
| 5,569,801 A * | 10/1996 | de Broqueville | 585/241 |
| 5,821,395 A * | 10/1998 | Price et al. | 585/241 |
| 6,197,264 B1 * | 3/2001 | Korhonen et al. | 422/136 |
| 8,257,657 B2 * | 9/2012 | de Broqueville et al. | 422/140 |
| 2007/0179326 A1 * | 8/2007 | Baker | 585/241 |
| 2009/0062581 A1 * | 3/2009 | Appel et al. | 585/241 |
| 2009/0321317 A1 * | 12/2009 | Widmer et al. | 208/113 |

FOREIGN PATENT DOCUMENTS

| | | |
|---|---|---|
| WO | 0226914 A2 | 4/2002 |
| WO | 2008081028 A2 | 7/2008 |

* cited by examiner

METHOD AND DEVICE FOR PROCESSING PLASTIC WASTE, ESPECIALLY POLYOLEFINS

BACKGROUND OF THE INVENTION

1. Field of the Invention

The invention relates to a method for processing plastic waste, especially polyolefins and a device for processing plastic waste, especially polyolefins used in particular in industrial utilization of plastic waste.

2. Brief Description of the Background of the Invention Including Prior Art

There is a known method of continuous plastic waste processing according to the Polish patent application P-358774 and a device for continuous processing of plastic waste. The processing method consists in that the plastic charge in a single-stage process is loaded, plasticized, fluidized and transformed thermocatalytically until a gas product is obtained, which is used for obtaining a hydrocarbons mixture constituting high-quality paraffin. The process is carried out in an inner vessel of an integrated vertically-oriented melting-exchange-reactor device where the plasticized and fluidized charge is converted into a uniform block of charge mass falling gravitationally. The device has a modular construction for single-stage process from the feeding point of charge to collecting a gas product and removing impurities.

According to the Polish patent application P-352341 there is another known method and production line for continuous processing of plastic waste where the waste is portioned and the charge is then delivered into a technological line, plasticized, forced into a reactor, where the plasticized charge is formed in the reactor into a uniform core falling gravitationally which is fluidized at the bottom and proportioned to the stabilizer. The final product is delivered into a cooler and liquefied.

From the publication of U.S. Pat. No. 5,500,120 titled "Auger-type chemical reformer" is known an apparatus for chemical reforming of organic materials which comprises a tubular housing having a longitudinal axis, and an open-end tube rotatably positioned in the tubular housing generally parallel to the axis, which tube carries radially extending projections.

Another publication of patent application no. US 2009/0321317 titled "Method and device for processing plastic-containing waste" teaches a method and device for processing plastic-containing and organic fluids based on crude oil, cooking oil, fats or the like. According to this publication the substance mixture is fed into a reactor, is then melted in the melting zone of the reactor and the interfering substances are discharged from the melt. The long-chained polymers still present in the melt are cracked in a crack zone of the reactor until they assume a gaseous state. Then the gas phase is discharged from the reactor an condensed in a cooler. Impurities are then removed from the volatile liquid present after cooling and the volatile liquid is stored.

Yet another publication of U.S. Pat. No. 4,235,676 titled "Apparatus for obtaining hydrocarbons from rubber tires and from industrial and residential waste" teaches that organic waste material such as industrial plastic waste is moved through the tube at a uniform rate of speed in the absence of air and/or oxygen, with the material being churned or tumbled as by means of a screw conveyor. The vapors and gases which are produced and/or liberated within the tube are quickly removed therefrom by means of a vacuum of from about four inches to about six inches of mercury, with the vapors being condensed and the gases separated therefrom.

In turn, the publication of international patent application no. WO 2008/081028 titled "Process and apparatus for waste treatment" teaches processes and apparatus for improving municipal waste treatment in autoclave processes. Improvements relate to the use of air-waste stream treatment, indirect heating with thermal fluid, forced steam transfer, autoclave design, waste treatment of contaminated air, classifiers for better separation of fibres from glass or grit and processing.

The publication of U.S. Pat. No. 5,190,226 titled "Apparatus and method for separation, recovery, and recycling municipal solid waste and the like" teaches introducing solid waste materials into a rotatable pressure vessel, rotating, pressurizing, and heating the pressure vessel and thus the waste material while simultaneously applying an extruding action to the solid waste material. The extruding action is achieved by a rotatable extruder mechanism carried in the pressure vessel which forces the processed solid waste material through a constricted area adjacent the exit of the pressure vessel.

Another publication of U.S. Pat. No. 5,427,650 titled "Apparatus and method for preparation for separation, recovery, and recycling of municipal solid waste and the like" teaches introducing solid waste materials into a rotatable pressure vessel, rotating, pressurizing, adding pH controlling chemicals and heating the pressure vessel and thus the waste material while simultaneously applying a mixing action to the solid waste material. The addition of a predetermined amount of pH controlling chemicals and the application of a vacuum serve to control the moisture content of the final fine organic portion of the processed material.

Furthermore, the publication of international patent application no. WO 02/26914 titled "Apparatus and method for recovering marketable products from scrap rubber" teaches feeding tire shreds to a pyrolysis vessel and pyrolyzing the shreds in a pyrolysis vessel to produce a pyrolysis gas and carbon black mixture. The pyrolysis gas processed by centrifugally separating entrained particles therefrom, separating the pyrolysis gas into a hydrocarbon condensate and a light vapor, removing entrained hydrocarbon condensate from the light vapor, and purifying and refining the hydrocarbon condensate. The carbon black mixture is processed by pulverizing the mixture to break up all strands and clumps of inorganic solids.

The known methods are usually based on gravitational falling of charge processed by thermal or catalytically-thermal cracking, so any disturbance of that falling has a direct influence on the entire process. Therefore there are problems with maintaining continuity of the process and its efficiency, which directly influences the economic aspect of the entire process.

SUMMARY OF THE INVENTION

Purposes of the Invention

It is an object of the present invention to provide a method of plastic waste processing, in particular polyolefins and constructing such a device for its implementation which will ensure the continuity of the process of plastic utilization where the parameters of the process can be readjusted and impurities removed in a hassle-free way.

This and other objects and advantages of the present invention will become apparent from the detailed description, which follows.

BRIEF DESCRIPTION OF THE INVENTION

According to the invention, a charge after being fed into a reactor is then fluidized and cracked during the forced progressive and rotational movement coinciding with heating at temperature of 400-500° C. and at ambient pressure, where a gas-steam fraction is removed continuously, whereas process impurities are removed periodically from the reactor.

It is preferable when at least a part of the gas-steam fraction is removed from the reactor by the charge feeding duct and only then is the part of the fraction cooled as it makes it possible to use the heat of the gas-steam fraction for plasticizing the charge, which enhances the heat efficiency of the process. In the most basic embodiment of the invention such a result is obtained by guiding a part of the gas-steam fraction by the charge feeding duct in the counter-flow way relative to the charge movement at a chosen section.

In order to maintain the movement stability and continuity of the process the level of the reactive mass in the reactor during fluidizing and cracking is generally maintained at the same level.

A device according to the invention comprises a reactor where fluidizing and cracking of a charge takes place. The reactor is a rotating drum to which leads a coaxial duct containing a built-in feeding conveyor by which the charge is fed to the reactor from one side and a part or all of the obtained steam-gas fraction is led out from the other side. Inside its chamber the reactor has guiding elements fixed permanently to its mantle, forcing axial and rotary movement of the charge. An extracting spiral is situated in the chamber of the reactor and delivering impurities to the built-in feeding conveyor used for taking the impurities to a waste tank during the cleaning cycle and used for feeding the charge from the charge feeding basket to the reactor during a production cycle.

It is most advisable when the rotatable reactor is a boiler drum whose inside diameter is equal to the length of its inner chamber.

The guiding elements inside the reactor's chamber can be a low-profile spiral panel permanently mounted on the rim of the chamber and stirring-slinging elements spaced on the rim, owing to which the melted reactive mass is spread on the cylindrical chamber, which results in an increased active reaction surface.

In order to maintain a relatively stable level of the melted reaction mass in the reactor a float can be installed inside the reactor's chamber.

It is also advisable when the reactor has a spiral outside panel permanently mounted on the outside surface of the mantle extending into the ducts leading the heating medium into the reactor. It allows for optimal use of the heating energy from the air coming from the furnace as the air surrounds the reactor in the forced, spiral movement conveying more heat to the outer reactor body on the longer route of outlet.

It is also advisable that the reactor's chamber should be equipped with an extracting spiral mounted on the inlet of the charge feeding duct facilitating the process of extracting and removing the impurities from the reactor during the cleaning cycle of the device.

In order for the charge to settle better in the reactor's chamber it is best when the duct, which is a pipe, inside which there is a worm conveyor for delivering the charge, has clearance holes located on the rim of the section inside the chamber.

Additionally, to facilitate passing of the part of the gas-steam fraction, the worm conveyor located in the charge feeding duct should be a ribbon worm conveyor in the section next to the reactor's inlet.

In the basic embodiment of the device the charge feeding duct has a connecting point of a receiving collector in the section next to the reactor's inlet, which is used for guiding the part of the gas-steam fraction from the reactor to the system of coolers. The volume of the gas-steam fraction flow through the collector is best regulated by a control valve mounted on the reactor's outlet.

To maintain the continuity of feeding charge doses to the reactor it is best when the charge from the feeding tank is fed into the duct with the worm conveyor by a worm feeder.

In the optimal embodiment the worm lead of the worm feeder gradually becomes smaller along with the charge traveling direction and the diameter of said feeder worm is also becoming gradually smaller in this direction, which allows for primary pressing of the fed charge portions. Finally, the worm lead of the worm feeder becomes half the size of the worm lead of the worm conveyor, and the diameter of the worm of the worm feeder is smaller by 5% than the diameter of the worm of the worm conveyor mounted in the charge feeding duct of the reactor.

It is also recommended for maintaining the smoothness of the charge reception when the worm feeder's revolutions are reduced to ½-¾ of revolutions of the worm conveyor installed in the charge feeding duct of the reactor.

The main advantage of the method according to the invention is that the whole process of charge feeding and its transport, feeding to the reactor, guiding out the final gas-steam product happens in a clearly defined way regarding the parameters of each action. There is also a relatively uncomplicated possibility of adjusting these parameters, which ensures an optimal process and prevents emergencies. When the process of fluidizing and cracking of the charge is simultaneous with forced imparting of rotational-progressive movement of the reactive mass, and when it is possible to control the speeds of these movements, then the optimal parameters of the reaction are obtained as well as high efficiency of the entire process.

The device itself is compact and comprises simple, commonly used, reliable subassemblies. Another advantage of the device according to the invention is uncomplicated cleaning and removal of waste, which requires stopping of the cracking process, reversing the direction of rotation of the reactor and worm conveyor in the charge feeding duct, stopping of the worm feeder and opening the lock over the waste tank. The device also has modular construction, which facilitates check-ups, repairs and subassembly replacement.

BRIEF DESCRIPTION OF THE DRAWINGS

Further details and features of the device for processing plastic waste, its nature and various advantages will become more apparent from the accompanying drawing and the following detailed description of the preferred embodiment shown in a drawing, in which.

DESCRIPTION OF INVENTION AND PREFERRED EMBODIMENT

Figure 1:
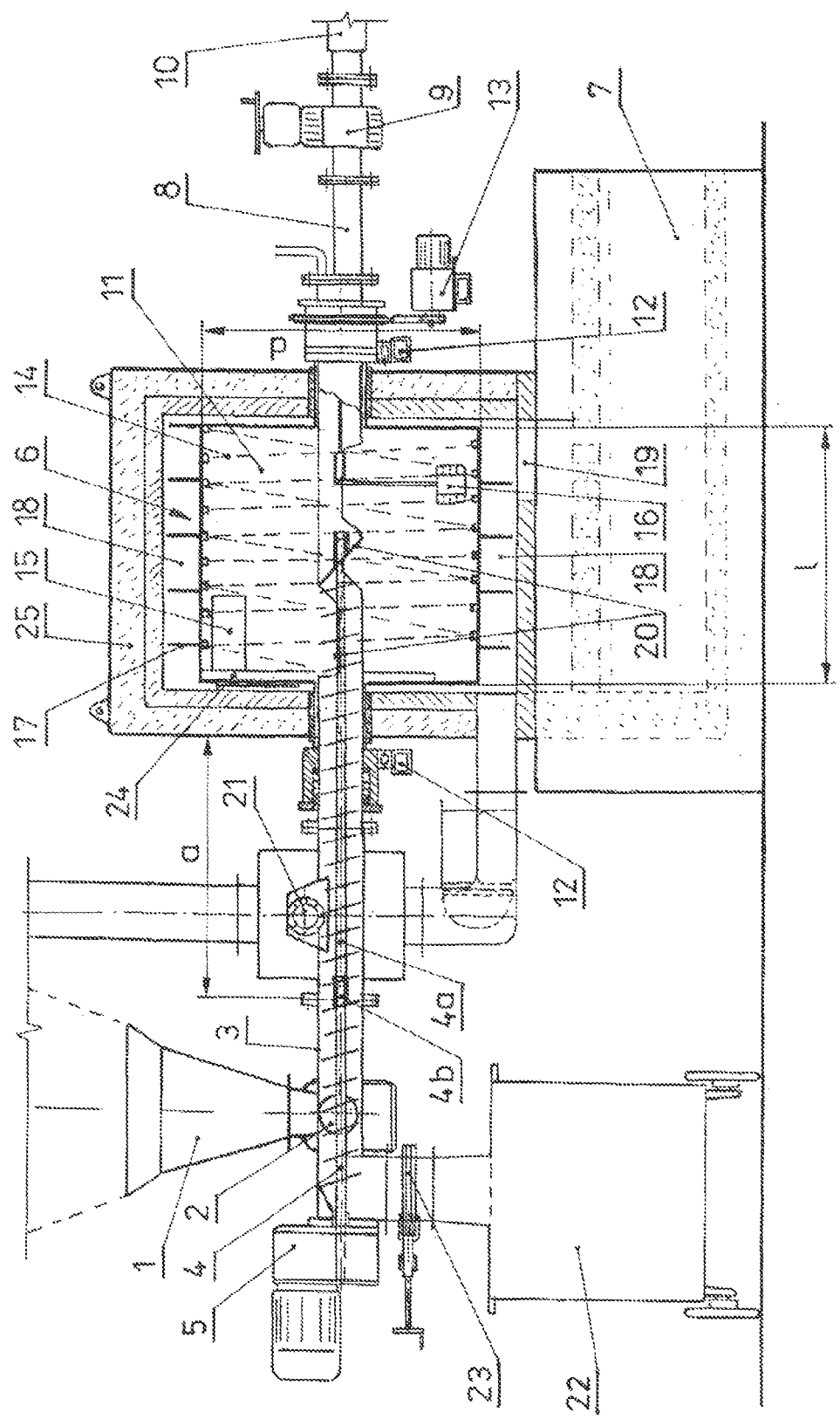
FIG. 1 shows a schematic side view of a device for waste plastic processing along direction of charge movement.
Figure 2:
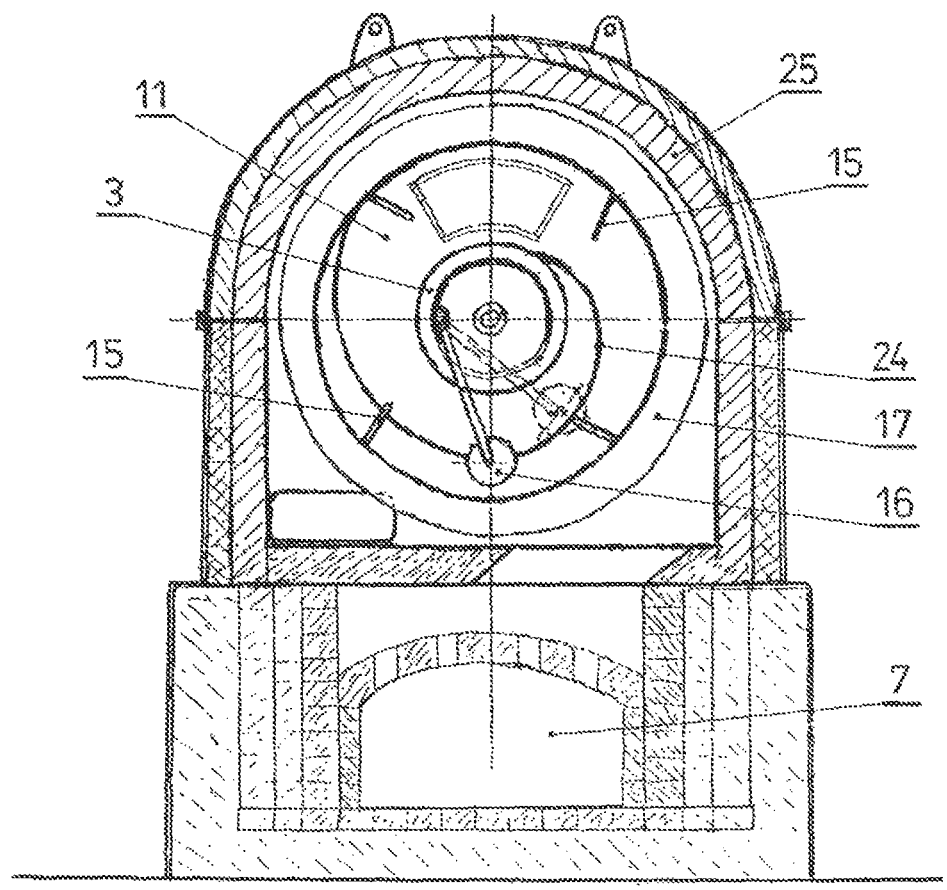
FIG. 2 shows a cross-section of a part of the device comprising a reactor and a furnace chamber.

The embodiments presented in the drawings are intended only for illustrative purpose and do not limit the scope of the invention, as defined by the accompanying claims.

A refined, granulated to app. 40×40 mm plastic charge is fed into a feeding basket 1. The refined charge is taken from the feeding basket 1 by a worm feeder 2 and fed into a pipe duct 3, inside which there is a worm conveyor 4 with a drive 5. The worm feeder 2 is equipped with a worm whose panels' lead gradually becomes smaller in such a way that at an entry of the duct 3 the lead of the panels is reduced by half in comparison with an initial lead, and also a diameter of the worm panel is reduced in the same direction so that it is 95% of the worm diameter at the beginning of the worm feeder. The revolutions of the worm feeder 2 are approximately half of the revolutions of the worm conveyor 4. Such a construction and movement parameters of the worm feeder 2 ensures the sealing of the reaction-receiving space located ahead. The duct 3 runs longitudinally inside a reactor 6 to which it delivers the charge transported from the feeding basket 1 by means of the worm feeder 2 and the worm conveyor 4 mounted in said duct 3. In the section before entry to the reactor 6 there is the duct 3 comprising a ribbon worm conveyor 4*a* which is an extension of the worm conveyor 4 and is clutched together by a clutch 4*b*. In order to achieve the best heat efficiency the reactor 6 is mounted above a furnace chamber 7 and has the form of a cylindrical drum with a horizontal axis with a charge feeding duct 3 coaxially leading to it from one side and a gas-steam fraction outlet system 8 equipped with a control valve 9 on the other side connected with a system of coolers 10. The reactor 6 has the inside diameter d approximately equal to the length/of its inside chamber 11 and is mounted rotatably on bearings 12 on both sides and operated with a drive unit 13. Inside its chamber 11, the reactor 6 has a low spiral profile panel 14 fixed to the rim and stirring-slinging elements 15 spaced on the rim. Inside the chamber 11 there is also an eccentrically mounted float 16 for the purpose of controlling and adjusting the level of the reactive mass. On its outside cylindrical surface the reactor 6 has a spiral external panel 17 extending into the ducts 18 transporting hot heating medium corning through the passage 19 from the furnace chamber 7, where said spiral panel 17 ensures effective reception of the heat by the reactor 6 and maintaining a relatively stable temperature in the chamber 11 of the reactor 6. The end of the duct 3 leading into the reactor's 6 chamber 11 has holes 20 on the rim, through which the charge is fed into the chamber 11 of the reactor 6. There is a receiving collector 21 connected with the duct 3 in the section a, which allows for dividing the end gas-steam product into two streams, before delivering it to the system of coolers 10. There is also a waste tank 22 closed off by a lock 23 connected with the duct 3 between the drive 5 of the worm conveyor 4 and the inlet of the worm feeder 2. The impurities from the chamber 11 of the reactor 6 are delivered to the worm conveyor 4 by means of an extracting spiral 24 mounted on the inlet of the chamber 11 of the reactor 6. The reactor 6 is cased by an insulating sleeve 25 whose upper part can be dismantled to ensure access to the reactor 6.

The refined charge is transported from the feeding basket 1 by means of the worm feeder 2 to the duct 3 inside which there is a dosing conveyor 4 having the form of a worm conveyor. The ribbon worm conveyor 4*a* which is the extension of the worm conveyor 4 takes the charge to the chamber 11 of the rotating reactor 6, where it is unloaded through the holes 20. In the chamber 11 the reactive mass is first fluidized and then decomposed while it is moving on the case of the chamber 11 in a rotational-progressive way. The reactor is heated by hot gas flowing around the reactor 6 through the channels 18. The gas-steam fraction in the chamber 11, which is a decomposition product of the reactive mass, is delivered by the control valve 9 partly directly to the system of coolers 10 and partly to the duct 3 in a counter-flow way to the direction of charge movement from where it is also delivered to the system of coolers 10 by the receiving collector 21. While a part of the gas-steam fraction going to the receiving collector 21 flows by the duct 3 in the counter-flow way to the charge travelling to the reactor, it gives up a part of the heat and plasticizes the charge before it is fluidized in the reactor. The level of the reactive mass in the chamber 11 is maintained relatively stable by the eccentric float 16 and by controlling the efficiency of the worm conveyor 4 delivering the charge to the reactor 6. Removing impurities from the device takes place in such a way that when the worm feeder 2 is switched off the process is continued for about an hour and then the lock 23 is opened and both the worm conveyor 4 and the reactor 6 are stopped. Then the worm conveyor 4 is reversed in relation to the normal work cycle and the revolutions of the reactor 6 are also reversed. The impurities from the chamber 11 are taken by the extracting spiral 24 and delivered on the worm conveyor 4 which takes them to the lock 23 where they fall into the waste tank 22. The entire time of the cleaning cycle depending on the amount of impurities takes 1-1.5 h. After the cleaning process is finished the lock 23 is closed, the reactor 6 and the worm conveyor 4 are reversed, and finally the worm feeder 2 is switched on, which begins the production cycle.

What is claimed is:

1. A method for plastic waste processing, the method comprising steps
    primarily refining a charge;
    feeding continuously the charge into a reactor;
    plasticizing, fluidizing and cracking the charge in the reactor in a thermal and/or catalytically-thermal way at temperature of 400-500° C. and at ambient pressure during forced progressive-rotational movement of the charge coinciding with heating;
    continuously removing a gas-steam fraction from the reactor; and
    periodically removing process impurities from the reactor.

2. The method according to claim 1, wherein at least part of the gas-steam fraction is removed from the reactor by a charge feeding duct and wherein then said part of the gas-steam fraction is cooled.

3. The method according to claim 2, wherein at least part of the gas-steam fraction is removed from the reactor in a counter-flow way relative to the charge movement at a chosen section.

4. The method according to claim 1 wherein during fluidizing and cracking level of reactor mass of the charge in the reactor is generally maintained at the same level.

5. The method according to claim 1, wherein the plastic waste is polyolefins.

6. A device for processing plastic waste, the device comprising
    a charge feeding basket;
    a reactor being a rotary drum heated by an external source of heat, the reactor having a chamber and a mantle surrounding the chamber of the reactor;
    a coaxial duct having holes in a section placed inside of the chamber of the reactor, the coaxial duct placed coaxial with the reactor, run longitudinally inside the reactor and provided with a built-in feeding conveyor and connected to the charge feeding basket and to the reactor and used for feeding at one side of the reactor a charge from the charge feeding basket to the inside of the reactor through the holes of the coaxial duct and used for leading out at other side of the reactor a steam-gas fraction obtained in the reactor;
    guiding elements situated in the chamber of the reactor and fixed permanently to the mantle of the reactor and forcing axial and rotary movement of the charge; and
    an extracting spiral situated in the chamber of the reactor and delivering impurities to the built-in feeding conveyor used for taking the impurities to a waste tank.

7. The device according to claim 6, wherein the rotary drum of the reactor has an inside diameter equal to a length of the chamber of the rotary drum.

8. The device according to claim 6, wherein the reactor has a spiral outside panel permanently mounted on an outside surface of the mantle extending into ducts leading heating medium into the reactor.

9. The device according to claim 8 wherein the reactor has on an inside rim of the chamber a low-profile panel permanently mounted on the inside rim of the chamber and stirring-slinging elements spaced on the inside rim of the chamber.

10. The device according to claim 6 wherein inside of the chamber of the reactor is situated a float mounted eccentrically to control a level of the charge fed to the chamber of the reactor by the built-in feeding conveyor.

11. The device according to claim 6, wherein the charge to the coaxial duct with the built-in conveyor is fed from the charge feeding basket by a worm feeder.

12. The device according to claim 11, wherein a worm lead of the worm feeder gradually becomes smaller along with a charge traveling direction and a diameter of a feeder worm gradually becomes smaller in the charge traveling direction.

13. A device for processing plastic waste, the device comprising
a charge feeding basket;
a reactor being a rotary drum heated by an external source of heat, the reactor having a chamber and a mantle surrounding the chamber of the reactor wherein the rotary drum of the reactor has an inside diameter equal to a length of the chamber of the rotary drum;
a coaxial duct having holes in a section placed inside of the chamber of the reactor, the coaxial duct placed coaxially with the reactor, run longitudinally inside the reactor and provided with a built-in feeding conveyor and connected to the charge feeding basket and to the reactor and used for feeding at one side of the reactor a charge from the charge feeding basket to the inside of the reactor through the holes of the coaxial duct and used for leading out at other side of the reactor a steam-gas fraction obtained in the reactor;
guiding elements situated in the chamber of the reactor and fixed permanently to the mantle of the reactor and forcing axial and rotary movement of the charge; and
an extracting spiral situated in the chamber of the reactor and delivering impurities to the built-in feeding conveyor used for taking the impurities to a waste tank during the cleaning cycle and used for feeding the charge from the charge feeding basket to the reactor during a production cycle.

14. The device according to claim 13, wherein the plastic waste is polyolefins.

* * * * *